Feb. 4, 1969
P. L. PASSLEY
PROCESS AND APPARATUS FOR CONDUCTING A
PLURALITY OF ALKYLATION REACTIONS
WITHIN A SINGLE REACTOR
Filed May 9, 1966
3,426,095
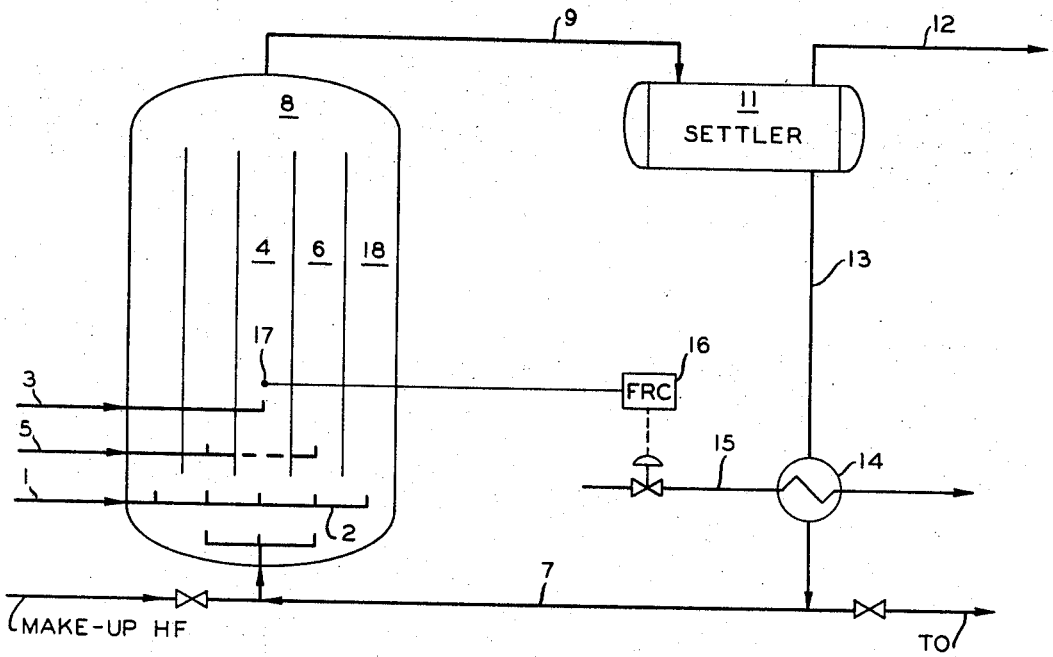
FIG. 1
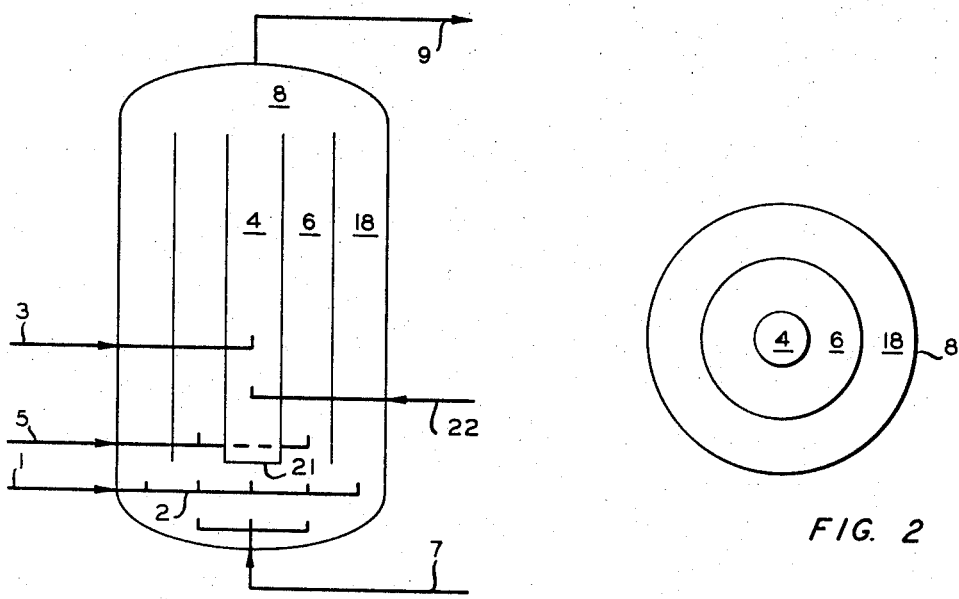
FIG. 3
FIG. 2
INVENTOR
P. L. PASSLEY
BY
*Young Jugg*
ATTORNEYS

United States Patent Office 3,426,095
Patented Feb. 4, 1969

3,426,095
PROCESS AND APPARATUS FOR CONDUCTING A PLURALITY OF ALKYLATION REACTIONS WITHIN A SINGLE REACTOR
Paul L. Passley, Springfield, Mass., assignor to Phillips Petroleum Company, a corporation of Delaware
Filed May 9, 1966, Ser. No. 548,471
U.S. Cl. 260—683.43            9 Claims
Int. Cl. C07c 3/50, 3/54

ABSTRACT OF THE DISCLOSURE

Concentric separators divide an alkylation reaction vessel into a central zone and at least two annular zones and wherein alkylation is conducted in the central zone at a higher temperature than alkylation in a surrounding annular zone wherein a different alkylate is produced, and further wherein heat exchange fluid comprising alkylation catalyst and alkylating agent is passed through an outer annular zone.

---

This invention relates to a process and apparatus for conducting chemical reactions. In one aspect, it relates to a method for conducting two separate chemical reactions and controlling their temperatures by conducting them in heat transfer relationship to each other. In another aspect, it relates to cooling a chemical reaction vessel by contacting it with a second chemical reaction mass which in turn is in indirect heat transfer relationship with a coolant. In still another aspect, it relates to a method and apparatus for conducting alkylation reactions whereby two different alkylations occur in heat transfer relationship with each other. In yet another aspect, it relates to a method of controlling two alkylations occurring at different temperatures which comprises cooling the first reaction mixture by heat transfer relationship with the second reaction mixture which in turn is in heat transfer relationship with a coolant. In another aspect, it relates to a method and apparatus for alkylating an isoparaffin with a plurality of olefins by conducting the various alkylation reactions in heat contact relationship with each other.

The alkylation of an isoparaffin such as isobutane or isopentane with olefins such as propylene, butylenes, and amylenes has been practiced utilizing various alkylation catalysts, particularly, HF acid. In applications where more than one olefin is to be reacted with an isoparaffin it is customary to either inject both olefins into a reactor, along with the isoparaffin, or to conduct two separate alkylation steps in different reactors. Some prefer alkylating in separate reactors with different olefins because a higher yield and higher quantity alkylate can be produced in each instance. This is due to the fact that optimum reaction conditions are different for different light olefins such as propylene, butylenes, and amylenes. This invention, in one embodiment, is concerned wih a method and apparatus for alkylating an isoparaffin with two or more light olefins in a single reactor which results in a high yield of high quality alkylate. In another embodiment, this invention is concerned with a method and apparatus for alkylating two isoparaffins with two or more light olefins in a single reactor to obtain a high yield of high quality alkylate.

Accordingly, it is an object of this invention to provide an improved process and apparatus for conducting a plurality of chemical reactions in a single reactor. It is another object of this invention to alkylate an isoparaffin with a plurality of olefins in a single reactor. It is still another object of this invention to alkylate a plurality of isoparaffins with a plurality of olefins. It is a further object of this invention to conduct two separate alkylation reactions at different temperatures within the same reactor.

Other aspects, objects, and the several advantages of this invention are apparent to one skilled in the art from a study of this disclosure, drawings and the appended claims.

According to the invention, two separate reactions take place in a single reactor divided into a plurality of zones in heat transfer relationship with each other, one of said zones being in heat transfer relationship with additional heat transfer means. Generally, the reactor will be divided by several concentric dividers forming a central reaction zone and a plurality of concentric annular reaction zones.

Thus, one reaction can be taking place in the central zone at one temperature. A second reaction at a different temperature is taking place in the immediately adjacent annular zone. Since the dividers are of heat conductive material, the second reaction may serve to either heat or cool the first reaction. The next annular zone can be used for a third reaction which is in heat transfer relationship with the second reaction. Any number of annular zones may be provided, and generally the outermost zone will contain a heat transfer fluid, either for cooling or heating the whole reactor. It will be obvious that this heat transfer fluid could alternately be in the central zone of the reactor, or in one of the intermediate annular zones.

The process of my invention can be used whenever two or more reactions are to be conducted at different temperatures. For example, alkylation reactions using various alkylatable materials and various alkylating agents are known to proceed most efficiently at different temperatures, and so can be conducted by the process of my invention. Isomerization reactions are also conveniently practiced, as are many others. Ordinarily, only two such reactions will be performed in a single reactor, although many more are possible as described above.

In one preferred embodiment of my invention, propylene is alkylated with isobutane in the central zone of a reactor. Butylene is alkylated with isobutane in the adjacent annular zone. By controlling the flow of coolant through the next annular zone, temperatures of the two alkylation zones can be maintained at the optimum temperature for the precise reaction which is taking place within each zone. The optimum range for alkylation of propylene with isobutane is 90° F. to 130° F., and the preferred range for alkylation of isobutane with butylene is from 60° F. to 100° F. By control of the temperature of the coolant used, these temperature ranges are easily maintained in the reaction zones. In the normal practice of my invention, the coolant used is recycled HF catalyst.

In another embodiment of my invention, both the alkylatable material and the alkylating agent are different in the two reaction zones. For example, the central zone may be used for the alkylation of propylene with isopentane, while the middle annular zone is used for the alkylation of butylene with isobutane. The optimum temperature range for the alkylation of propylene with isopentane is 70 to 110° F.

The isobutane to olefin ratio is in the range of 5 to 25 by volume and, preferably, is about 12. When alkylating with propylene and butylenes, it is preferred that 10 to 60 percent of the olefin feeds is propylene and the remainder is butylenes, the propylene and butylene being in separate feeds.

The catalyst is 88 to 92 percent by weight HF with a water content in the range of 0.1 to 1.0 percent and an acid-soluble oil content in the range of 0.1 to 1.0 percent. The HF acid recycle rate is in the range of 0.25 to 5.5 volumes of HF per volume of hydrocarbon.

My invention will be better understood by reference to the drawings, in which FIGURE 1 shows a flow sheet for the process of my invention, and FIGURE 2 shows a cross-sectional view of the reactor used in the process of my invention. FIGURE 3 shows a modified reactor which can be used in the practice of my invention.

Referring to FIGURE 1, isoparaffin is introduced to the reactor through line 1 and sparge ring 2. A first olefin, for example, propylene, is introduced through line 3 to central reaction chamber 4. A second olefin, as for example, butylene, is introduced through line 5 to the adjacent annular chamber 6. HF catalyst is introduced through line 7 to a sparge ring in the lower part of reactor 8. The alkylate-HF emulsion which is formed in the process of this invention is removed through line 9, to separator 11. The alkylate is taken off through line 12, and the separated HF catalyst is returned through line 13 and heat exchanger 14 through line 7 and then to the reactor. The coolant in heat exchanger 14 flows through line 15, having its rate of flow controlled by flow rate controller 16, which operates responsive to temperature sensor 17 in the reactor.

As is seen in FIGURE 2, the reactor is divided into a central zone 4 and a plurality of annular zones 6 and 18. All of the reactants introduced to the reactor are introduced through sparge rings to insure a good distribution of the materials in each zone.

In the embodiment shown in FIGURE 1, the concentric zone dividers are open at both top and bottom to allow the isoparaffin introduced through sparge ring 2 to enter all zones. In an alternate embodiment, where isobutane is to be the alkylating agent only in the annular zone, and a different isoparaffin, such as isopentane, is to be used in the central zone, the bottom of inner zone 4 would be closed off, and an additional sparge ring provided inside this zone to deliver the isopentane thereto. Such a reactor is shown in FIGURE 3, where the bottom of central zone 4 is closed by bottom 21, and isoparaffin and HF catalyst are introduced to central zone 4 through line 22. Other numeral designations in this figure are identical to those in FIGURE 1. Generally, the alkylates are mixed at the top of the reactor and carried off together through line 9, but it would, of course, be possible to provide separate collectors for each of the zones and thereby keep the alkylate products separate.

The desired temperature range in each reaction zone may be maintained by controlling in combination the flow rates of the olefins through lines 3 and 5, and the amount of cooling in heat exchanger 14. Cooled HF catalyst flows upwardly through outer annular zone 18, carried along with isobutane introduced through sparge ring 2, and, in effect, serves as a cooling packet for annular zone 6. The reaction taking place in middle annular zone 6 is, therefore, cooled by the cold catalyst and isoparaffin flow in outer annulus 18. The reaction in inner zone 4 is in turn cooled by the reaction mass in middle annular zone 6, but will, of course, retain a temperature somewhat higher than the temperature in zone 6.

While the embodiments are discussed above as related to HF catalyzed reactions of paraffins and olefins, my invention is not limited to such an embodiment. A different catalyst for alkylation, such as sulfuric acid, can be used. Alkylating agents and alkylatable materials other than paraffins and olefins are included, such as aromatic-olefin alkylation, as are types of reactions other than alkylation, as, for example, isomerization, such as conversion of methylcyclopentane to cyclohexane normal paraffins to isomeric paraffins, etc., or dehydrohalogenation. Furthermore, the central reaction zones and annular reaction zones can contain solid catalyst, either the same or different catalysts in different zones.

The desired temperature range in each reaction zone may be maintained by controlling in combination the flow rates of the olefins through lines 3 and 5, and the amount of cooling in heat exchanger 14. Cooled HF catalyst and isoparaffin flows upwardly through outer annular zone 18, along with isobutane introduced through sparge ring 2, and, in effect, serves as a cooling jacket for annular zone 6. The reaction taking place in middle annular zone 6 is, therefore, cooled by the cold catalyst and isoparaffin flow in outer annulus 18. The reaction in inner zone 4 is in turn cooled by the reaction mass in middle annular zone 6 but will, of course, retain a temperature somewhat higher than the temperature in zone 6.

EXAMPLE

An alkylation operation carried out in an apparatus similar to that shown in the drawings results in the following flow pattern:

| | Gal./min. |
|---|---|
| Isobutane (fresh plus recycle) | 1620 |
| Butylene | 90 |
| Propylene | 30 |
| HF recycle | 1620 |

| | Temperature, °F. |
|---|---|
| HF recycle | 90 |
| Central zone, average | 110 |
| Annular zone, average | 100 |

The yield of mixed alkylate obtained is 175 volume percent of olefin feed, and this found to have a research octane rating (leaded w/3 cc. TEL) of 103.5.

Reasonable variation and modification are possible within the scope of the foregoing disclosure, drawings and the appended claims to the invention, the essence of which is that a plurality of chemical reactions occur in a single reactor, one reaction being in heat transfer relationship with a second reaction, and the second reaction being in heat transfer relationship with additional heat transfer means.

I claim:

1. An alkylation process for carrying out at least two different alkylation reactions in a single alkylation vessel having a central zone and at least two surrounding annular zones, wherein the alkylation zones are in concentric heat transfer relationship, which comprises:
   (a) introducing into said central zone an alkylating agent, an alkylatable material and an alkylation catalyst under alkylation conditions at a first temperature to form a first alkylate;
   (b) introducing into a first annular zone surrounding said central zone an alkylating agent, an alkylatable material and an alkylation catalyst under different alkylation conditions of temperature from that of said central zone to form a second alkylate;
   (c) passing heat exchange fluid comprising alkylating agent and alkylation catalyst through a second annular zone surrounding said first annular zone, the temperature of said heat exchange fluid being different from the temperature of the reaction being conducted in said first annular zone;
   (d) combining said first alkylate, said second alkylate and said heat exchange fluid and passing same to a separation zone; and
   (e) recovering alkylate and alkylation catalyst from said separation zone and returning said catalyst after cooling to said vessel for reuse in the process.

2. A process according to claim 1 wherein said alkylating agent is the same in said central zone and said first and second annular zones and wherein the alkylatable materials in said central annular zone are of different composition from the alkylatable material in said first annular zone.

3. A process according to claim 1 wherein said alkylating agents in said central annular zone are of different composition from the alkylatable materials in said first annular zone and wherein said alkylatable materials are of different composition in said central and said annular zones.

4. A process according to claim 2 wherein said alkylatable material in said central zone is propylene and said alkylating agent is isobutane and the temperature in said central zone ranges from 90–130° F., and wherein the alkylatable material in said first annular zone is butylene and said alkylating agent is isobutane and the temperature in said first annular zone ranges from 60–100° F. and the alkylating agent in said heat exchange fluid is isobutane.

5. A process according to claim 3 wherein said alkylatable material in said central zone is propylene and said alkylating agent in said central zone is isopentane and the temperature in said central zone is in the range 70–110° F. and the alkylatable material in said first annular zone is butylene and said alkylating agent is isobutane and the temperature in said first annular zone ranges from 60–100° F. and the alkylating agent in said heat exchange fluid is isobutane in said second annular zone.

6. A process according to claim 1 wherein the temperature of said alkylation catalyst returned to said vessel is controlled responsive to the temperature of the alkylation reaction being carried out in said vessel.

7. An alkylation reaction vessel comprising, in combination:
(a) an elongated enclosed substantially vertical vessel having an outlet in open communication with the upper portion of said vessel and an inlet in open communication with the lower portion of said vessel;
(b) a first axially aligned tubular chamber located within said vessel in open communication at its upper end with said upper portion of said vessel and defining a central alkylation chamber;
(c) a second axially aligned tubular chamber surrounding said first tubular chamber and defining a second alkylation chamber therewith, said second alkylation chamber being in open communication at its upper end and lower end, respectively, with said upper portion and said lower portion of said vessel;
(d) a third axially aligned tubular chamber surrounding said second alkylation chamber and defining a reaction chamber, said third chamber being in open communication at its upper and lower ends, respectively, with said upper portion and said lower portion of said vessel; and
(e) conduit means extending in from the exterior of said vessel into the lower portion of said central alkylation chamber to introduce alkylating agent and alkylatable material into said central alkylation chamber, conduit means extending in from the exterior of said vessel into a lower portion of said second alkylating chamber for introducing alkylating agent and alkylatable material into said second alkylating chamber, and conduit means extending in from the exterior of said vessel to introduce alkylating agent into a lower portion of said third chamber.

8. An apparatus according to claim 7 including a sparger in the lower portion of said vessel for introducing alkylating agent into the lower open end of all of said chambers and separate conduits for introducing different alkylating agents into said central alkylating chamber and said second alkylating chamber.

9. An apparatus according to claim 8 wherein the lower end of said central alkylating chamber is closed and is in open communication with the vessel only at its upper outlet end, and further including separate conduits for introduction of alkylatable material and alkylating agent and catalyst into a lower portion of said central alkylating chamber.

References Cited
UNITED STATES PATENTS

| | | | |
|---|---|---|---|
| 2,853,369 | 9/1958 | Kölbel et al. | 23—288 |
| 2,360,699 | 10/1944 | McAllister et al. | 260—683.43 |
| 2,394,412 | 2/1946 | Veltman | 260—683.47 |
| 2,454,869 | 11/1948 | Goldsby et al. | 260—683.53 |
| 3,169,153 | 2/1965 | Walker et al. | 260—683.47 |

DELBERT E. GANTZ, *Primary Examiner.*

G. J. CRASANAKIS, *Assistant Examiner.*

U.S. Cl. X.R.

260—683.48; 23—288